United States Patent [19]

Gooray et al.

[11] Patent Number: 5,136,328
[45] Date of Patent: Aug. 4, 1992

[54] BOUNDARY LAYER DISTURBER FOR HEAT MANAGEMENT

[75] Inventors: Arthur M. Gooray; Robert P. Siegel, both of Penfield, N.Y.

[73] Assignee: Xerox Corporation, Stamford, Conn.

[21] Appl. No.: 767,715

[22] Filed: Sep. 30, 1991

[51] Int. Cl.$^5$ ............................................. G03B 27/52
[52] U.S. Cl. ........................................... 355/30; 355/67
[58] Field of Search .................... 355/67, 30, 43, 51, 355/233, 235

[56] References Cited

U.S. PATENT DOCUMENTS

| | | | |
|---|---|---|---|
| 4,386,842 | 6/1983 | Beery | 355/8 |
| 4,632,539 | 12/1986 | Temple | 355/30 |
| 4,945,383 | 7/1990 | Kobayashi et al. | 355/30 |
| 5,063,404 | 11/1991 | Milillo | 355/30 |

Primary Examiner—Richard A. Wintercorn

[57] ABSTRACT

A boundary layer disturber for removing heat from the platen of a copier is in the form of an improved scanning reflector which has a portion thereof in the form of a "scoop". During scanning motion, the reflector entrains air flow which disturbs and peels the thermal boundary layer from underneath the platen glass, thus passively improving platen glass cooling. Also, the reflector is contoured to allow air to entrain over the lamp assembly, resulting in enhanced cooling. As a result of changing the form of the reflector there is increased cooling characteristics in the optics cavity, thus allowing blowers with lower power and noise levels to be utilized in the optics cavity.

19 Claims, 6 Drawing Sheets

BOUNDARY LAYER DISTURBER FOR HEAT MANAGEMENT

BACKGROUND OF THE INVENTION

This invention relates generally to an electrophotographic printing machine, and more particularly concerns a boundary layer disturber for cooling a glass platen for such a machine.

In conventional copying or scanning machines, an original document to be reproduced is placed or conveyed onto a glass platen located in the object plane. The document is incrementally illuminated by an elongated lamp assembly, either by moving the platen while the lamp is held stationary, or by moving the lamp assembly (lamp reflector and scan mirror) beneath a stationary platen. Alternatively, both the scan lamp and the platen can be held fixed and the document moved across the platen surface in a continuous velocity transport (CVT) mode. In any of these cases, a problem to be anticipated and prevented is a buildup of heat at the platen, the heat being a byproduct of operation of the scanning lamp. The lamps used for document scanning are typically mercury fluorescent or tungsten halogen. With either source, but particularly with the tungsten halogen type of lamp, the heat buildup at the platen may pose a problem with continued operation. With continued usage, the platen may become so hot as to present a safety concern for the machine operator or cause defects in the platen glass.

Conventional copying machines employ large and noisy blowers in an optics cavity to reduce the heat buildup of platen glass. The blowers provides cooling of lamp, reflector, and optics base pan contained in the optics cavity. Also, the blowers provide pressurization of the optics cavity as to prevent processor dirt and ambient dirt from contaminating sensitive optical components. And, it has been found that the thermal boundary layer, which is a thin layer of heated air closely adjacent to the lower surface of the platen, tends to be difficult to remove with standard convection methods.

Various other approaches have been devised to increase platen glass cooling, the following disclosure appears to be relevant:

U.S. Pat. No. 4,945,383 discloses an image forming apparatus which includes a temperature control device to control the temperature of light on a photosensitive medium. The apparatus is comprised of a pair of cooling fans and a heat ray reflecting shutter. The heat ray reflecting shutter aids in the ventilation created by the fans.

U.S. Pat. No. 4,632,539 discloses an apparatus for cooling a fluorescent lamp by causing a flow of cooling air to pass along a conduit extending along the length of the lamp.

Even with the above mentioned teaching available, the problem with heat build up on the platen glass remains.

SUMMARY OF THE INVENTION

Accordingly, in accordance with the present invention, a boundary layer disturber in the form of an improved scanning reflector is disclosed that has a portion thereof in the form of a "scoop". During, scanning motion the reflector passively cools the platen glass by entraining air flow which disturbs and peels the thermal boundary layer from the platen glass. Also, the reflector is contoured to allow air to entrain over the lamp assembly, resulting in enhanced cooling. As a result of changing the form of the reflector thee is improved cooling characteristics in the optics cavity, thus allowing blower with lower power and noise levels to be utilizing in the optics cavity.

BRIEF DESCRIPTION OF THE DRAWINGS

Other aspects of the present invention will become apparent as the following description proceeds and upon reference to the drawings, in which:

FIG. 3a shows a chart indicating experimental data from a machine design configuration without the scoop shaped reflector of FIG. 1 and a blower ON.

FIG. 3b is a chart depicting experimental data from a machine design configuration with the scoop shaped reflector of FIG. 1 and a blower ON.

While the present invention will hereinafter be described in connection with various embodiments thereof, it will be understood that it is not intended to limit the invention to these embodiments. On the contrary, it is intended to cover all alternatives, modifications and equivalents that may be included within the spirit and scope of the invention as defined bu the appended claims.

Figure 1:
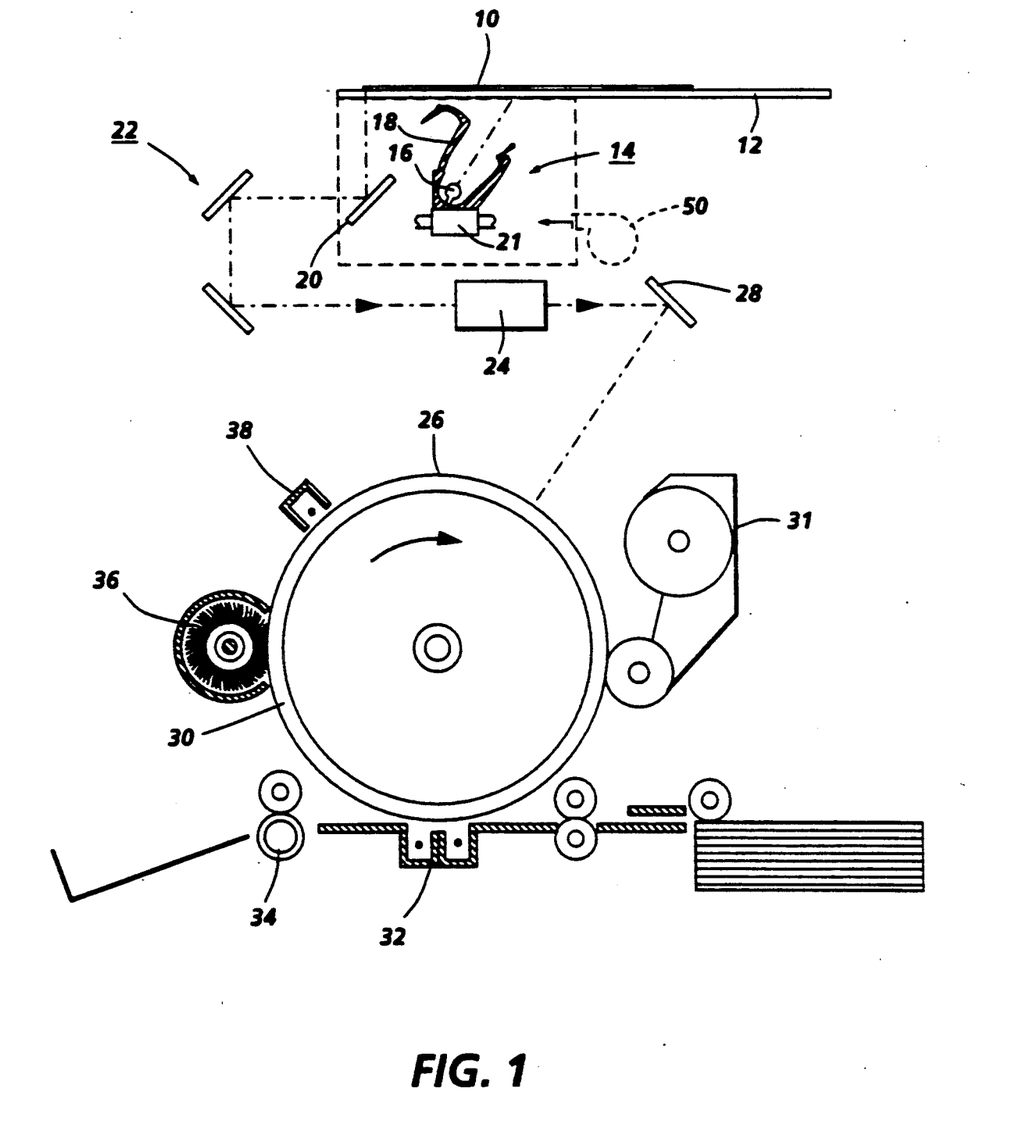
FIG. 1 is a side schematic view of a document imaging system incorporating the document illumination lamp assembly and the scoop shaped reflector of the present invention.

For a general understanding of the features of the present invention, reference is made to the drawings. In the drawings, like reference numerals have been used throughout to designate identical elements. FIG. 1 schematically depicts the various elements of an illustrative electrophotographic printing machine incorporating the apparatus of the present invention therein. It will become evident from the the following discussion that this apparatus is equally well suited for use in a wide variety of printing machines and is not necessarily limited in its application to the particular embodiments depicted herein.

Inasmuch as the art of electrophotographic printing is well known, the various processing stations employed in the FIG. 1 printing machine will be shown hereinafter schematically and their operation described briefly with reference thereto.

DETAILED DESCRIPTION OF THE INVENTION

Turning now to the figures, FIG. 1 is a side schematic view of a light lens document imaging system incorporating a tungsten halogen lamp as the document illuminator. It is understood that other types of illumination lamps may be used consistent with the principles of the present invention. As shown, a document 10 to be copied is placed on the surface of a transparent platen 12 A scanning assembly 14 consists of a tungsten halogen lamp 16, an associated reflector 18 in accordance with the present invention, and a scan mirror 20. Scanning assembly 14 is mounted for parallel movement along a scan path beneath and parallel to platen 12 on a scan carriage 21. Half-rate mirror assembly 22, adapted to travel on a ½ rate scan carriage (not shown) at ½ the rate of mirror 20, reflects line images of the document into projection lens 24. Lens 24 projects a flowing image of the document onto the surface of drum 26 via drum mirror 28. Arranged around the drum 26 are conventional xerographic processing stations; a developing station 31 for applying a toner of suitable polarity to the latent image formed on the drum surface; a transfer station 32 for transferring the developed image to an output sheet; fusing station 34 for fixing the transferred image to the copy sheet; a cleaning station 36 and a charging station 38 for applying a uniform charge to the drum surface. In a document scanning mode, carriage 21 is driven on guide rails by conventional drive means, from left to right to incrementally scan document 10. The carriage drive system of U.S. Pat. No. 4,386,842 is suitable for this purpose and the contents of this patent are hereby incorporated by reference. At the end of scan, the carriage is returned to the start of scan position. During repeated scan operation, heat generated by the lamp, in the absence of any heat reduction mechanism, could result in an overheating condition at the platen which might result in an unsafe condition for an operator, or possibly subject the platen glass to stresses and fractures.

It is believed that the foregoing description is sufficient for purposes of the present application to illustrate the general operation of an exemplary electrophotographic printing machine incorporating the features of the present invention therein.

Figure 2:
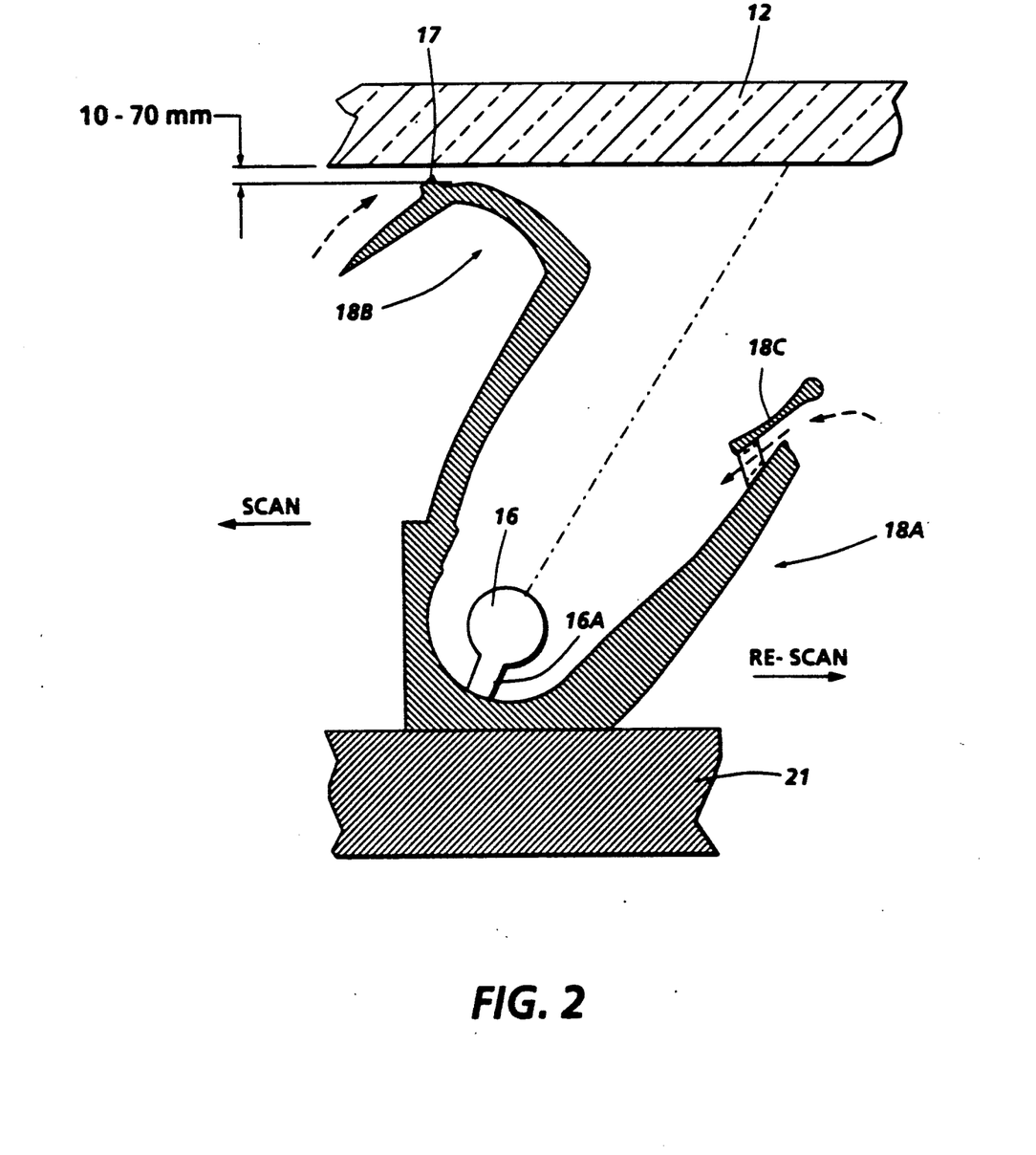
FIG. 2 is an enlarged side view of the forward scanning lamp assembly and reflector of FIG. 1.

According to the principles of the present invention, a "scoop" shaped reflector is incorporated in order to reduce the heat buildup at the platen during the various modes of operation. Referring to FIGS. 1 and 2, scanning assembly 14 is shown, absent scan mirror 20, in an enlarged detailed side view. For this embodiment, lamp 16 is a segmented frosted halogen lamp. Lamp protrusion 16A, formed essentially along the lamp envelope midpoint, is the usual projection formed at the lamp sealing point. Protrusion 16A is preferably located so as to ensure proper seating of the annulus and to attain maximum surface area contact with "scoop" shaped reflector 18. The lamp is cradled within the curved portion of "scoop" shaped reflector 18. In operation, and referring to FIGS. 1 and 2, as a scan operation begins, lamp 16 is turned ON and the intense light output generated by the lamp is directed by the curved sides of reflector 18 towards the platen glass 12 to form an incremental illumination strip along the platen width. Carriage 21 is moved in a right-to-left direction and light reflected from document 10 is reflected by mirror 20, mirror pair 22, and projected by lens 24 along the optical path to expose the photoreceptor 26 in an imagewise pattern representative of the document.

As the scanning operation progresses, the temperature of the platen glass 12 increases and a thermal boundary layer develops under the platen glass 12. It is well known that a thermal boundary layer may be defined as the region where temperature gradients are present in the flow. These temperature gradients result from a heat-exchange process between the air and the platen.

Without the scoop shaped reflector 18, the boundary layer on the platen would be a "laminar" like boundary layer, that is, the forces and the momentum would be balanced and the heat and mass transfer diffusion times in the boundary layer are longer compared to a "turbulent" boundary layer. The heat-transfer coefficient of the boundary layer is inversely proportional to the thickness of the boundary layer. When the copier is in operation the lamp heats up the platen and the laminar boundary layer thickness increases, resulting in a reduction of heat-transfer coefficient of the boundary layer, thereby causing the boundary layer to act like an insulator thus reducing the platen ability to transfer heat.

According to the principles of the present invention, during operation of the copier, the scanning carriage moves the "scoop" shaped reflector 18 creating air flow which produces turbulence in the thermal boundary layer. The boundary layer becomes a "turbulent" boundary layer, that is, a boundary layer with irregular eddying motion in the air flow. The irregular eddying acts to transport heat from platen into the air stream below the platen, thus the platen's ability to transfer heat is improved. Also, in a turbulent boundary layer only a very thin region near the lower or bottom platen surface has a laminar characteristic, thus a turbulent boundary layer stores less heat than a laminar boundary layer.

Figure 3A:
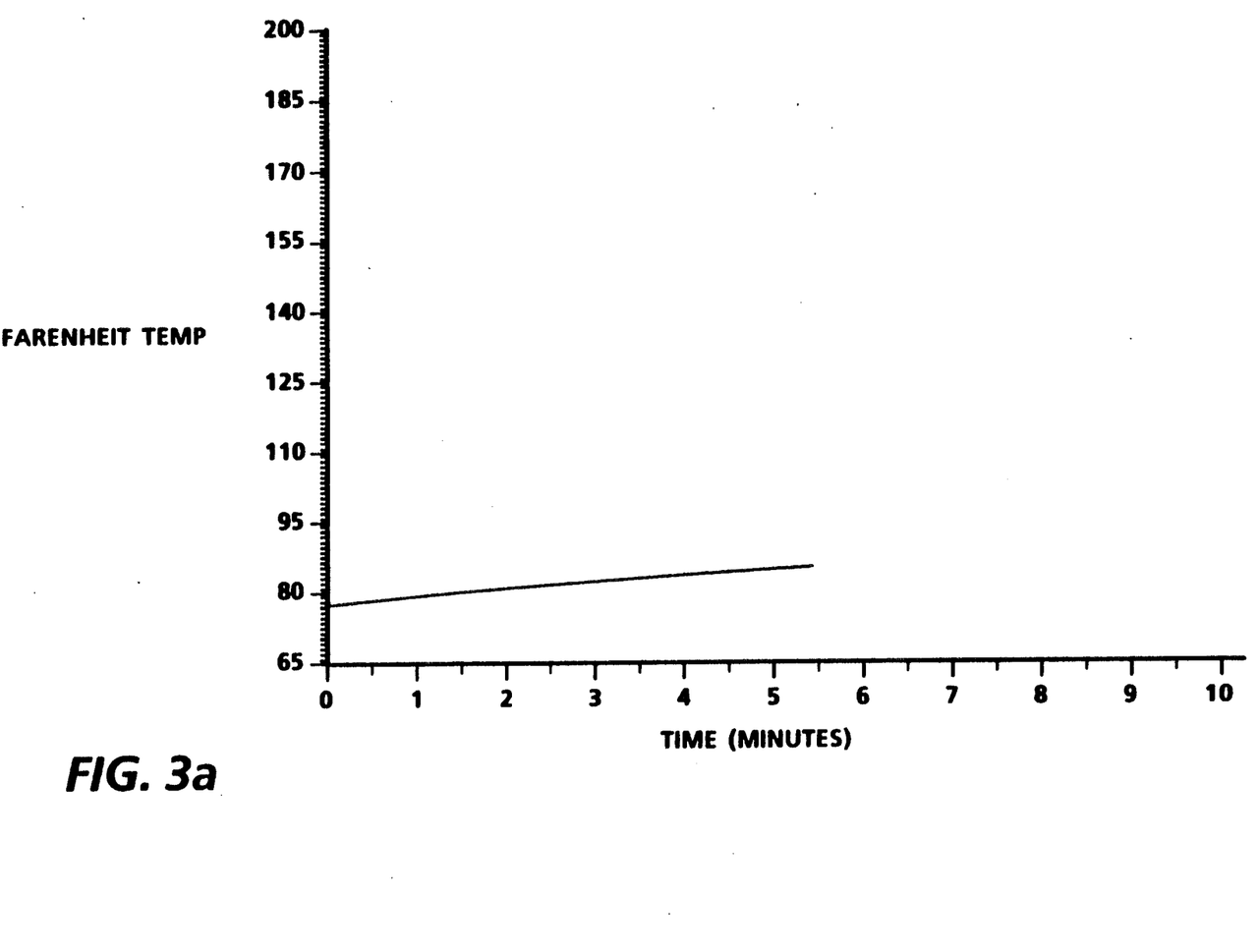
Figure 3B:
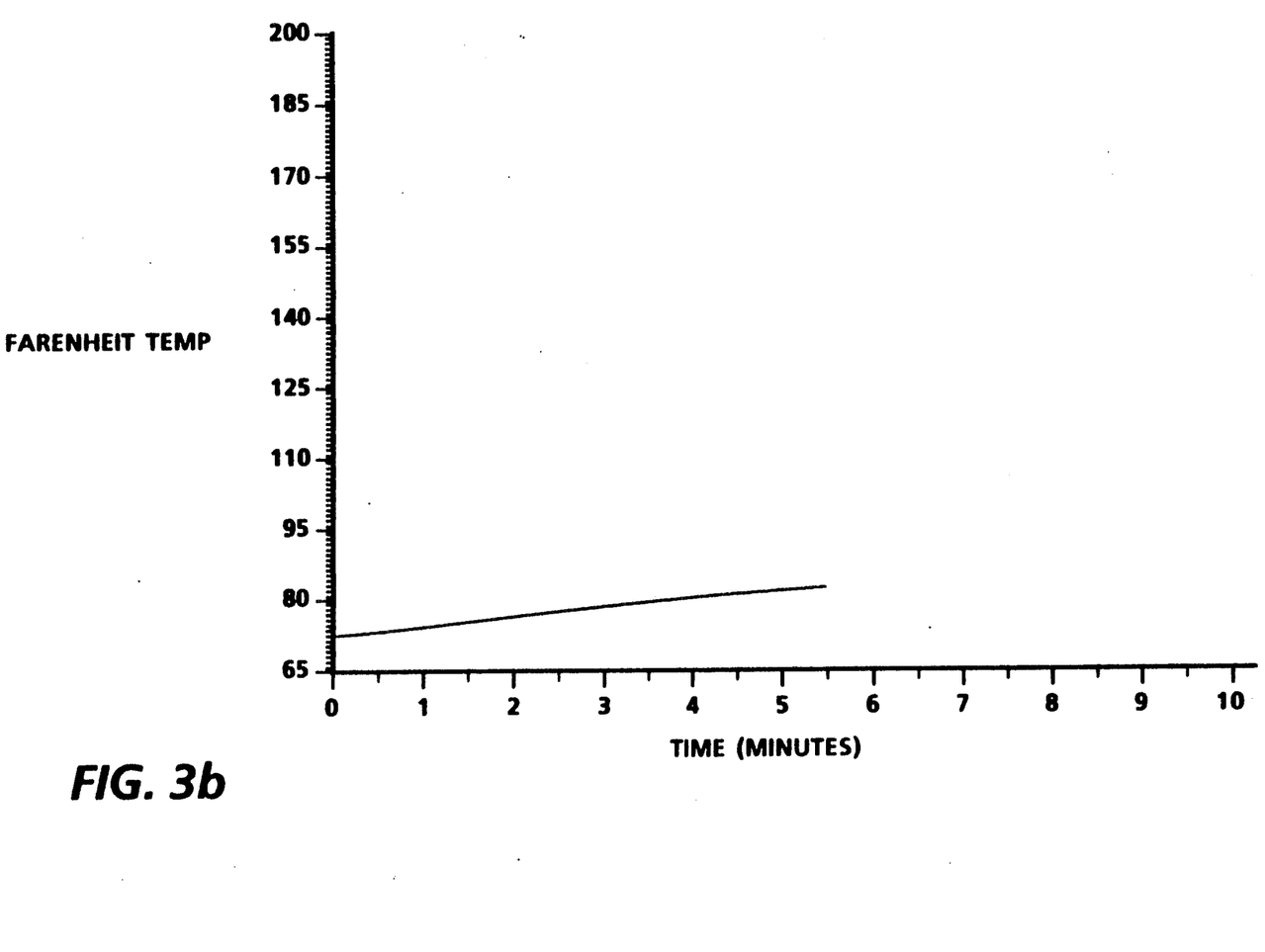
Figure 3C:
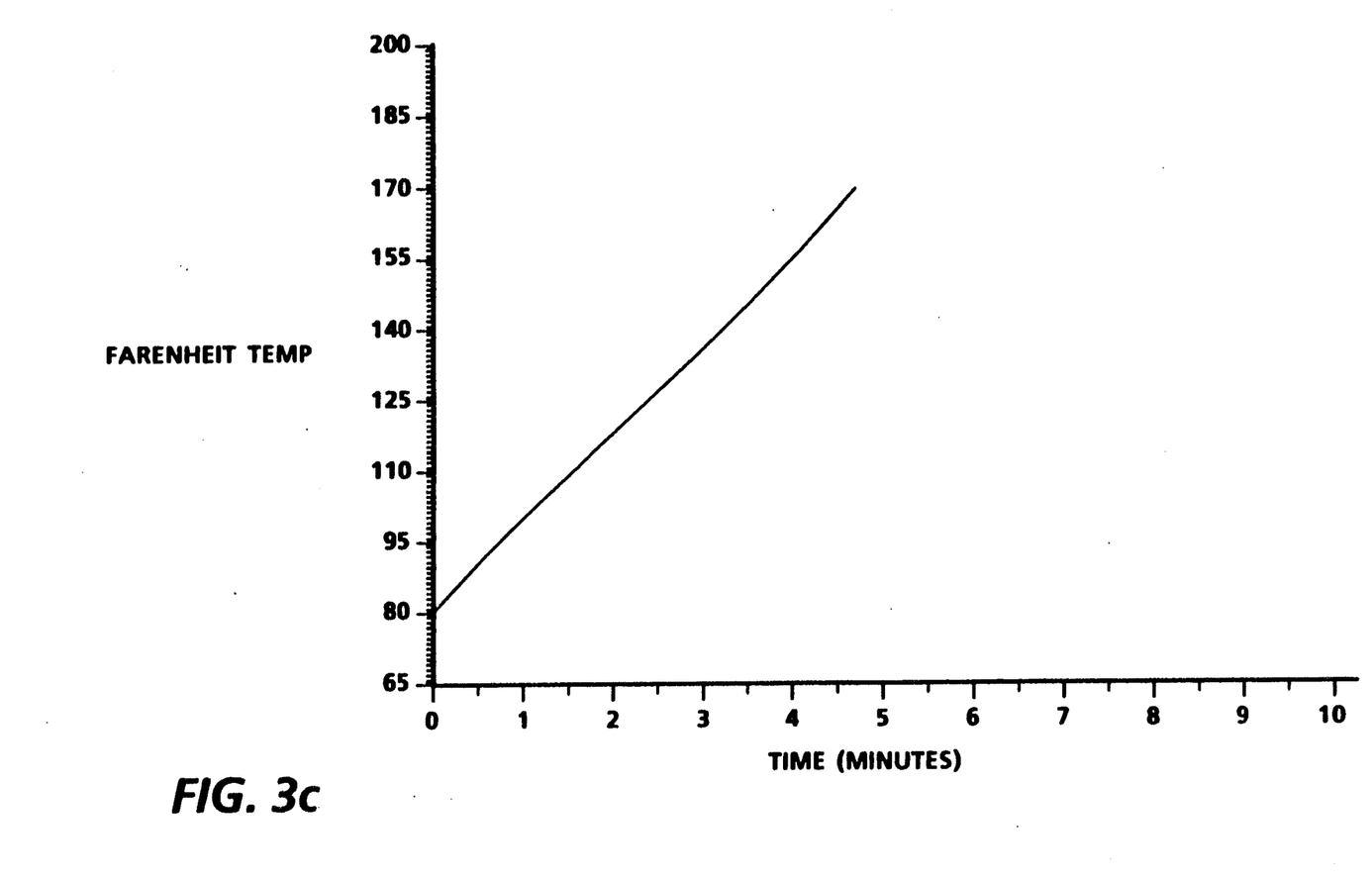
FIG. 3c shows a chart indicating experimental data from a machine design configuration without the scoop shaped reflector of FIG. 1 and a blower OFF.
Figure 3D:
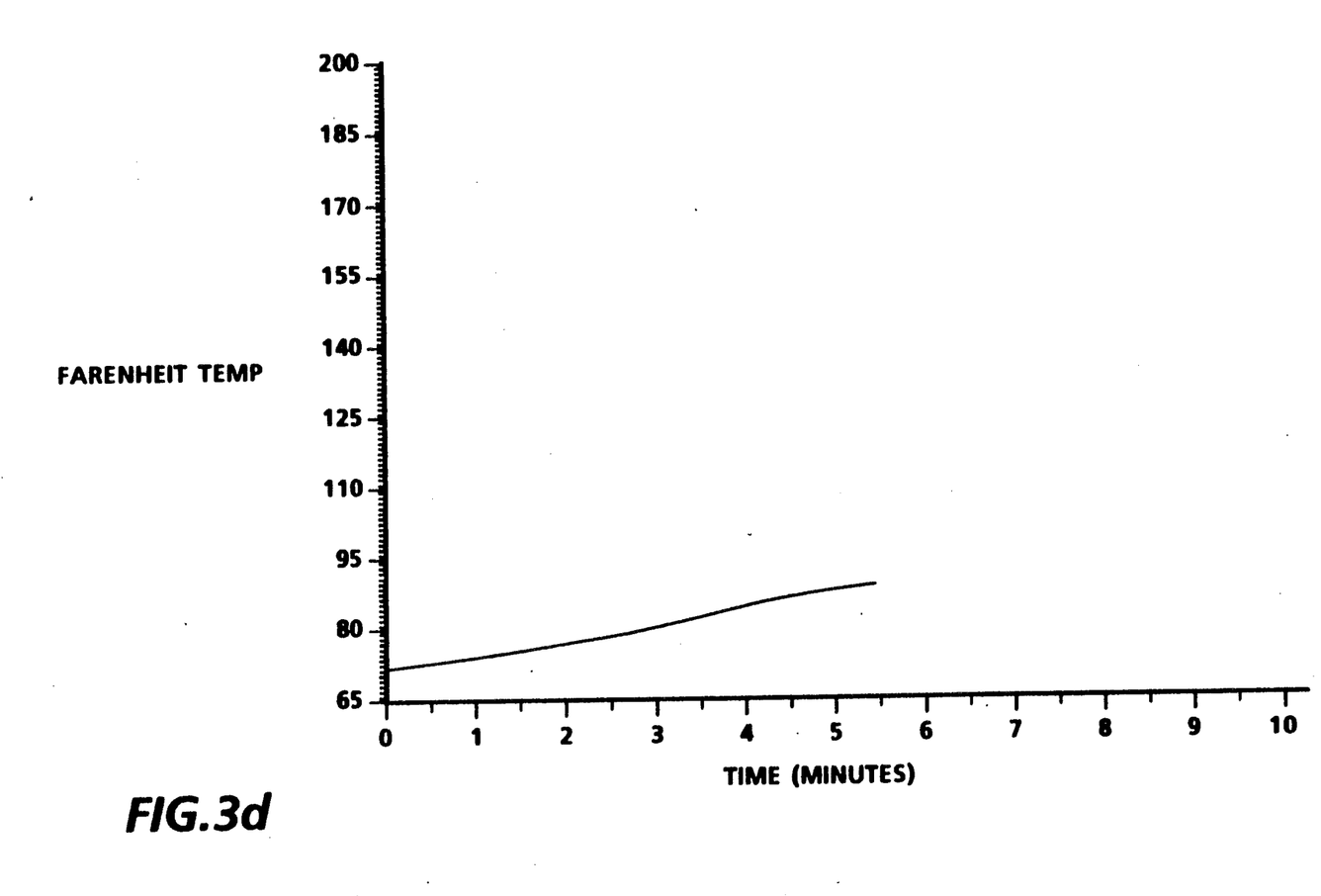
FIG. 3d shows a chart indicating experimental data from a machine design configuration with the scoop shaped reflector of FIG. 1 and a blower OFF.

In a test configuration similar to the one shown in FIG. 1, with "scoop" shaped reflector 18 installed, a significant reduction in platen temperature was achieved during machine operation with the scoop compared to operation without the "scoop" shaped reflector. For example, FIG. 3a, shows experimental data from a machine design configuration without the scoop shaped reflector and a blower ON, where it was found that after 2 and 5 minutes that the platen temperatures were 80° Fahrenheit and 87° Fahrenheit, respectively. In FIG. 3b, however, with the scoop shaped reflector installed and the blower ON, it was found that after 2 and 5 minutes that the platen temperatures were 73° Fahrenheit and 80° Fahrenheit, respectively. In FIG. 3c, a machine design configuration was tested without the scoop shaped reflector and with the blower OFF, and it was found that after 2 and 5 minutes the platen temperatures were 115° Fahrenheit and 170° Fahrenheit, respectively. In FIG. 3d, however, with the scoop shaped reflector installed and the blower OFF, it was found that after 2 and 5 minutes the platen temperatures were 75° Fahrenheit and 80° Fahrenheit, respectively. Also, it was experimentally found that the gap needed between the reflector 18 outermost region and the under surface of the platen 12 to adequately disturb the boundary layer is about 10 mm to 70 mm.

As shown in FIG. 2, the "scoop" shaped reflector 18 comprises a parabolic shaped portion 18A. The parabolic shaped portion 18A is mounted on carriage 21 so that the line of symmetry of parabolic shaped potion 18A is tilted at an angle with respect to a plane defined by the platen glass. The upper arm portion 18A includes a downwardly curved portion 18B. Portion 18B has hump like boundary layer trips 17 located on the top surface thereof. The boundary layer trips 17 are utilized on the top surface of reflector 18 to increase turbulence in the heat boundary layer during scanning operations. A foil-like member 18C is mounted on the inner surface of the lower arm of portion 18A. There is a space between the inner surface of portion 18B and the bottom surface of member 18C which allows air flow to cool the lamp 16.

The surface of the "scoop" portions are reflective so that the reflector 18 can focus illumination. The reflector 18 is composed of suitable materials that are lightweight, rigid, thermally conductive, and thermally stable, for example, aluminum. The reflector 18 "scoop" portions are contoured to contain stray illumination of light in the cavity, and also contoured to entrain air flow to disturb the boundary layer when the carriage moves in the scan direction, and when the carriage moves in the rescan direction the "scoop" portion of reflector 18 provides air flow to cool the lamp 16.

While the invention, boundary layer disturber, is shown as a reflector with a "scoop" portion attached thereto or an extension thereof, it should be understood that alternative shaped boundary layer disturbers could be employed if desires. For example, a boundary layer disturber member could be attached to the scanning carriage, separately mounted to move beneath the platen, or a series of individual boundary layer disturber members could be used.

It is, therefore, evident that there has been provided, in accordance with the present invention a boundary layer disturber that fully satisfies the aims and advantages hereinbefore set forth. While this boundary layer disturber has been described in conjunction with various embodiments thereof, it is evident that many alternatives, modifications and variations will be apparent to those skilled in the art. Accordingly, this invention is intended to embrace all such alternatives, modifications and variations as fall within the spirit and board scope of the appended claims.

What is claimed is:

1. A boundary layer disturber apparatus that reduces heat from a platen when a document on the platen is incrementally illuminated by a scan assembly, by disturbing a boundary layer on the surface of the platen opposite the document, said comprising:
   a carriage, said carriage being adapted to move beneath the platen, and
   a first scoop member adapted to be moved by said carriage thereby creating air flow to disturb said boundary layer beneath the platen when said carriage moves.

2. The apparatus of claim 1, wherein said scan assembly is mounted on said carriage and includes a reflector and an elongated illumination lamp disposed within said reflector.

3. The apparatus of claim 2, wherein said reflector includes said first scoop member and a second coop member connected thereto and extending therefrom.

4. The apparatus of claim 3, wherein said first scoop member surface is reflective in order to focus illumination from said lamp.

5. The apparatus of claim 4, wherein said second scoop member is contoured so that said reflector contains stray illumination of light in an optics cavity.

6. The apparatus of claim 3, wherein said first scoop member is adapted and contoured such that when said carriage moves in a first direction said reflector entrains air flow to disturb said boundary layer and when said carriage moves in an opposite second direction said reflector entrains air flow to cool said lamp.

7. The apparatus of claim 1, wherein said first scoop member has boundary layer trips on a surface thereof.

8. In a copier having a platen for placing documents thereon for imaging and a scanning system for illuminating the document and exposing a photoreceptor, the scanning system including a lamp for illuminating the document, a reflector for focusing light from the lamp against the document and a carriage for moving the lamp and the reflector back an forth beneath the platen to incrementally illuminate the document, the improvement comprising:
   a boundary layer disturber means for reducing heat build up on the platen by disturbing a boundary layer which is closely adjacent the surface of the platen opposite the reflector; and means for moving said boundary layer disturber means, said boundary layer disturbing means being configured to interfere with air along the surface of the platen adjacent the reflector as it is moved back and forth by said means for moving said boundary layer disturber means.

9. The improvement of claim 8, said boundary layer disturber means is a part of the reflector.

10. The improvement of claim 9, wherein said boundary layer disturber means includes a trips means on one surface thereof for increasing the disturbing capability of said boundary layer disturber means as it is moved back and forth by said means for moving said boundary layer disturber means.

11. The improvement of claim 9, wherein said boundary layer disturber means includes scoop shaped portions.

12. The improvement of claim 11, wherein said means for moving said boundary layer disturber means is a carriage.

13. The improvement of claim 12, wherein said boundary layer disturber means is adapted and contoured such that when said carriage moves in a predetermined direction said boundary layer disturber means entrains air flow to disturb said boundary layer and when said carriage moves in the opposite direction said boundary layer disturber means entrains air flow to cool the lamp and the reflector.

14. A method for reducing heat build-up on a platen of a copier when a document on the platen is incrementally illuminated by a scan assembly, comprising the steps of:
   providing a carriage that moves back and forth beneath the platen;
   providing a disturber member for disturbing a boundary layer located beneath the platen;
   adapting said boundary layer disturber member to be moved by said carriage;
   moving said carriage beneath the platen thereby moving said boundary layer disturber member to create air flow to disturb the boundary layer and thereby cooling the platen.

15. The method of claim 14, including the steps of:
   providing the scan assembly with a lamp to illuminate the platen and a reflector to focus illumination on the platen; and
   mounting said scan assembly to said carriage.

16. The method of claim 15, including the step of:
   providing said boundary layer disturber member as a part of said reflector.

17. The method of claim 14, including the step of:
   providing said boundary layer disturber member with a trips means on one surface thereof for increasing the disturbing capability of said boundary layer disturber member.

18. The method of claim 14, including the step of:
   adapting and contouring said boundary layer disturber member such that when said carriage moves in a scan direction said boundary layer disturber member provides vertical air flow to disturb said boundary layer and when said carriage moves in the rescan direction said boundary layer disturber member provides air flow to cool the lamp and the reflector.

19. A boundary layer disturber apparatus that reduces heat from a platen when a document on the platen is incrementally illuminated by a scan assembly by disturbing a boundary layer on the surface of the platen opposite the document, comprising:

a scoop member adapted to disturb the boundary layer beneath the platen; and means for moving either the platen or said scoop member relative to each other such that the movement causes said scoop member to disturb the boundary layer underneath the platen to thereby cool the platen.

* * * * *